United States Patent
Pretty

(10) Patent No.: US 9,499,275 B2
(45) Date of Patent: Nov. 22, 2016

(54) STRESS-RELIEVING JOINT BETWEEN MATERIALS WITH DIFFERING COEFFICIENTS OF THERMAL EXPANSION

(71) Applicant: ROHR, INC., Chula Vista, CA (US)

(72) Inventor: Michael Sean Pretty, El Cajon, CA (US)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 14/516,362

(22) Filed: Oct. 16, 2014

(65) Prior Publication Data

US 2016/0107757 A1 Apr. 21, 2016

(51) Int. Cl.
*B64D 27/00* (2006.01)
*B64D 29/06* (2006.01)
*B64D 29/02* (2006.01)

(52) U.S. Cl.
CPC ............ *B64D 29/06* (2013.01); *B64D 29/02* (2013.01)

(58) Field of Classification Search
CPC .... B64D 27/26; B64D 27/262; B64D 29/02; B64D 29/06; B64C 3/00; B64C 1/064; B64C 1/065; B64C 1/061; B64C 1/069; B23K 20/00; B23K 20/0002; B23K 20/008; B23K 20/02; B23K 20/021; B23K 20/023; B23K 20/025; B23K 20/026; B23K 20/028; F16B 2001/0078
USPC ................. 244/54, 123.5; 228/115, 234.1, 228/235.1–235.3, 193–195, 262.5–262.51, 228/262.71–262.72; 29/889.1–889.722
See application file for complete search history.

(56) References Cited

U.S. PATENT DOCUMENTS

| | | | | |
|---|---|---|---|---|
| 5,278,574 A | * | 1/1994 | Zimmerman | H01Q 21/0087 333/245 |
| 6,613,450 B2 | * | 9/2003 | Tsukaguchi | B32B 18/00 228/122.1 |
| 7,857,194 B2 | * | 12/2010 | Kramer | B32B 7/04 228/122.1 |
| 8,882,040 B2 | * | 11/2014 | Stulc | B64C 1/069 244/120 |
| 2004/0058188 A1 | * | 3/2004 | Groll | A47J 36/02 428/651 |
| 2004/0060968 A1 | * | 4/2004 | Takahashi | C04B 37/021 228/122.1 |
| 2004/0126612 A1 | * | 7/2004 | Shinkai | C04B 37/026 428/627 |
| 2005/0006529 A1 | * | 1/2005 | Moe | B64D 15/12 244/134 D |
| 2005/0098609 A1 | * | 5/2005 | Greenhut | B23K 35/001 228/122.1 |

(Continued)

FOREIGN PATENT DOCUMENTS

WO    WO 2012/098331    *    7/2012    ............. B64C 1/26

OTHER PUBLICATIONS

Fitzer E. "Composites for high temperature", p. 291, 1988.*

*Primary Examiner* — Valentina Xavier
*Assistant Examiner* — Assres H Woldemaryam
(74) *Attorney, Agent, or Firm* — Snell & Wilmer, L.L.P.

(57) ABSTRACT

A composite component may be coupled to an aluminum component with a plurality of fasteners. An expansion strap may be located between the composite component and the aluminum component. The expansion strap may have a coefficient of thermal expansion which is greater than the coefficient of thermal expansion of the composite component, and less than the coefficient of thermal expansion of the aluminum component. A first set of fasteners may be inserted through the composite component, the expansion strap, and the aluminum component. A second set of fasteners may be inserted through the composite component and the expansion strap. The expansion strap may decrease stress in the composite component at the fastener locations.

10 Claims, 4 Drawing Sheets

(56) References Cited

U.S. PATENT DOCUMENTS

| | | | |
|---|---|---|---|
| 2008/0000235 A1* | 1/2008 | Hanson | F01D 17/141 60/770 |
| 2008/0023585 A1* | 1/2008 | Kordel | B64C 3/00 244/123.5 |
| 2008/0286600 A1* | 11/2008 | Vecchio | B23K 20/023 428/600 |
| 2010/0122868 A1* | 5/2010 | Chiou | B64D 33/02 181/213 |
| 2012/0037760 A1* | 2/2012 | Koppelman | B64C 21/06 244/209 |
| 2012/0126062 A1* | 5/2012 | Stewart, III | B64D 33/02 244/131 |
| 2013/0236692 A1* | 9/2013 | Tanaka | B64C 3/182 428/137 |
| 2014/0263836 A1* | 9/2014 | Guillemaut | B64C 1/26 244/131 |
| 2015/0041059 A1* | 2/2015 | Olson | F02K 1/56 156/308.6 |

* cited by examiner

STRESS-RELIEVING JOINT BETWEEN MATERIALS WITH DIFFERING COEFFICIENTS OF THERMAL EXPANSION

FIELD

The disclosure generally relates to materials. More particularly, the disclosure relates to stress-relieving joints between materials having different coefficients of thermal expansion.

BACKGROUND

Modern aircraft may utilize a gas turbine engine propulsion system. Weight and cost may be significant factors in designing components for the propulsion system. Additionally, components in the propulsion system may experience high temperatures. Aluminum and composite material systems are often used in this environment for their favorable qualities of strength versus weight. Some component designs require composite materials and aluminum materials to be fastened together. However, aluminum has a much higher coefficient of thermal expansion than many composite materials. At the temperatures experienced in some areas of the propulsion system, the differing coefficients of thermal expansion may result in significant loads at the location of fasteners between the aluminum and composite materials, which may damage the composite components unless they are sufficiently reinforced against these loads which usually means more weight and cost.

SUMMARY

A joint may comprise a first component, a second component, a third component and a first plurality of fasteners. The first component may have a first coefficient of thermal expansion. The second component may have a second coefficient of thermal expansion. The second coefficient of thermal expansion may be greater than the first coefficient of thermal expansion. The third component may have a third coefficient of thermal expansion. The third coefficient of thermal expansion may be greater than the second coefficient of thermal expansion. The first plurality of fasteners may couple the first component, the second component, and the third component together. The second component may be located between the first component and the third component. The first plurality of fasteners may pass through the first component, the second component, and the third component.

In various embodiments, the first component may comprise a composite material. The third component may comprise aluminum. The second component may comprise titanium. The joint may comprise a second plurality of fasteners. The second plurality of fasteners may couple the first component to the second component. The second plurality of fasteners may pass through the first component and the second component. The first component may comprise a nacelle component for an aircraft. The first plurality of fasteners may comprise at least one of a bolt or a rivet. The second component may be configured to decrease a bearing load on the first component.

An aircraft nacelle may comprise an aluminum component, a composite component, a titanium expansion strap located between the aluminum component and the composite component, and a first plurality of fasteners coupling the aluminum component to the composite component.

In various embodiments, a coefficient of thermal expansion of the titanium expansion strap is greater than a coefficient of thermal expansion of the composite component and less than a coefficient of thermal expansion of the aluminum component. The nacelle may comprise a second plurality of fasteners coupling the composite component to the titanium expansion strap. The titanium expansion strap may be configured to reduce a bearing load on the composite component. The composite component may comprise a bond panel. The aluminum component may comprise a hinge beam. The composite component may be configured to withstand a bearing load from the aluminum component at a temperature of at least 300° C. (570° F.).

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods for coupling materials having differing coefficients of thermal expansion are disclosed. A composite component may be coupled to an aluminum component with a plurality of fasteners. An expansion strap may be located between the composite component and the aluminum component. The expansion strap may have a coefficient of thermal expansion which is greater than the coefficient of thermal expansion of the composite component, and less than the coefficient of thermal expansion of the aluminum component. A first set of fasteners may be inserted through the composite component, the expansion strap, and the aluminum component. A second set of fasteners may be inserted through the composite component and the expansion strap. The expansion strap may decrease stress in the composite component at the fastener locations.

Figure 1:
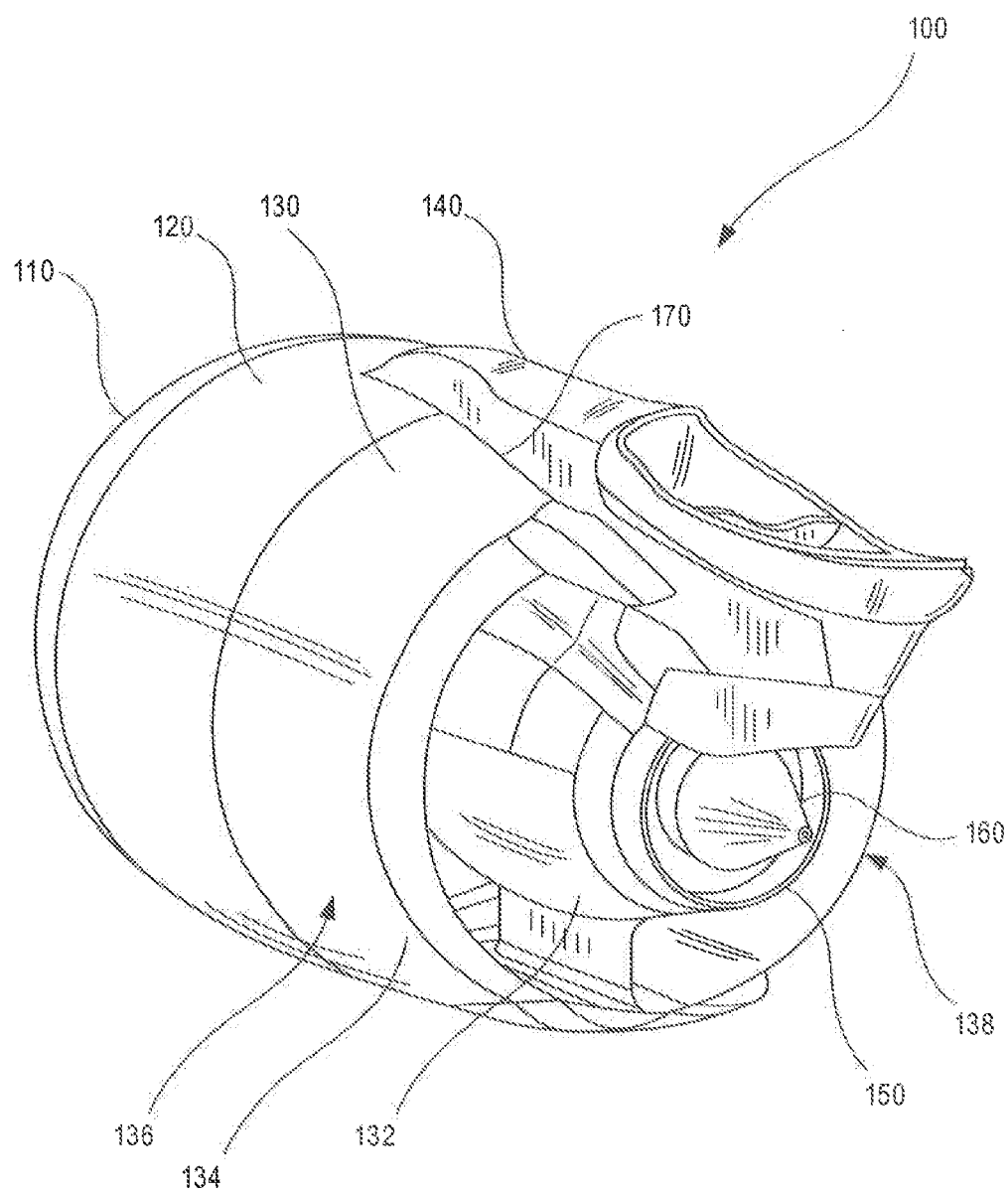
FIG. 1 illustrates a perspective view of a nacelle in accordance with various embodiments.

Referring to FIG. 1, a nacelle 100 for a gas turbine engine is illustrated according to various embodiments. Nacelle 100 may comprise an inlet 110, a fan cowl 120, and a thrust reverser 130. Nacelle 100 may be coupled to a pylon 140, which may mount the nacelle 100 to an aircraft wing or aircraft body. Thrust reverser 130 may comprise an inner fixed structure ("IFS") 132 and a sleeve 134. Bypass air from an engine fan may flow between the IFS 132 and the sleeve 134. An exhaust nozzle 150 is coupled to the engine which surrounds an exhaust centerbody 160, which together form a nozzle for the core engine air to exit the engine and provide thrust. The thrust reverser 130 may further be split into a left half 136 and a right half 138. The left half 136 and the right half 138 may be hinged to the pylon 140 at hinges 170. The left half 136 and the right half 138 may hinge open at hinges 170 in order to provide access to the engine. Many components in nacelle 100 may be comprised of aluminum, such as hinge beams and latch beams and bond panel closeouts, and many components in nacelle 100 may be comprised of composite materials, such as bond panels which form the sleeve and the IFS. Aluminum and composite components may be coupled together with a titanium strap between the aluminum component and the composite component. The titanium strap may decrease loads on the composite component due to differing coefficients of thermal expansion.

Figure 2:
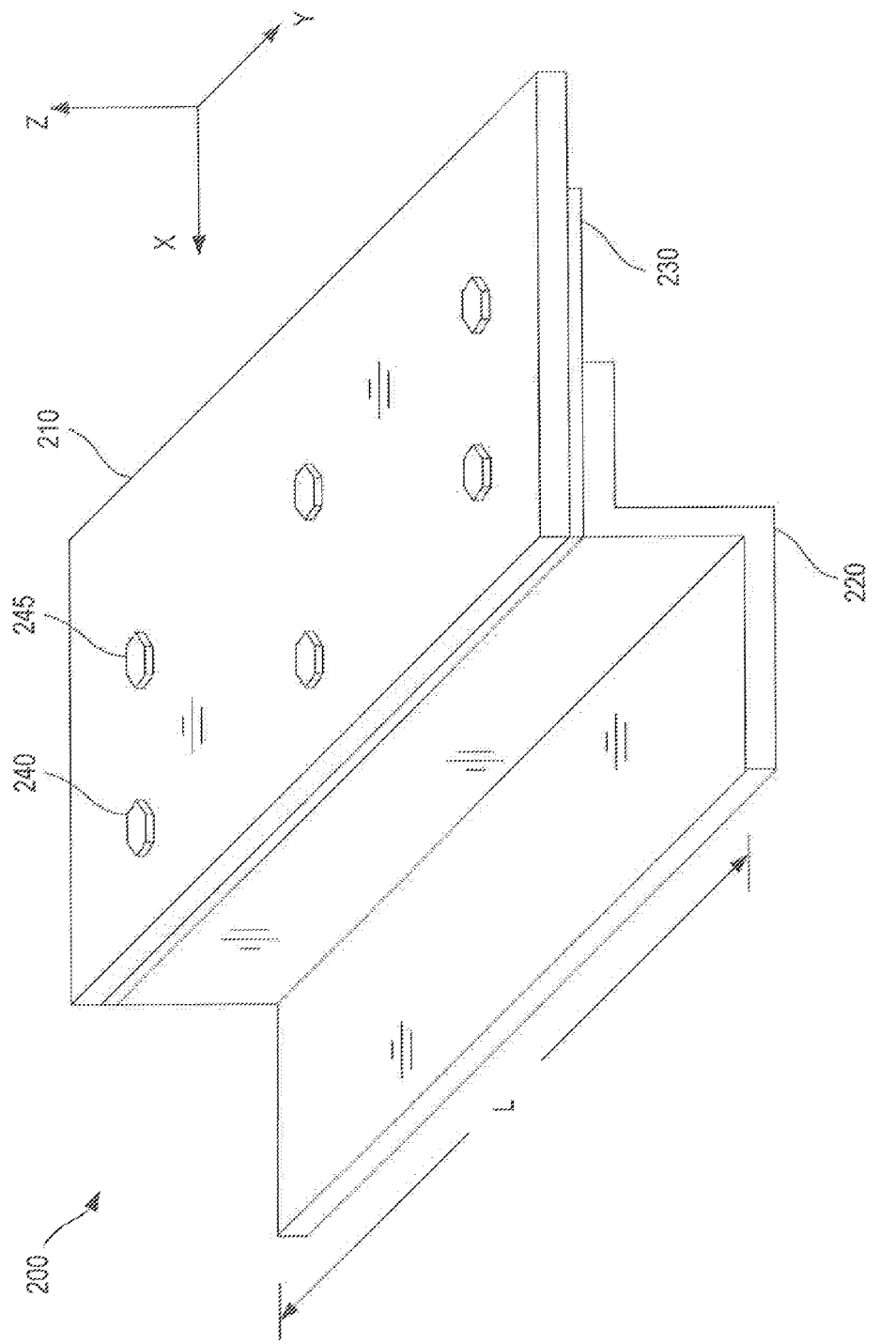
FIG. 2 illustrates a perspective view of a joint in accordance with various embodiments.

Referring to FIG. 2, a joint 200 is illustrated according to various embodiments. The joint 200 may join a composite component 210 to an aluminum component 220. An expansion strap 230 may be located between the composite component 210 and the aluminum component 220. The expansion strap 230 may have a coefficient of thermal expansion which is greater than the coefficient of thermal expansion of the composite component 210 and less than the coefficient of thermal expansion of the aluminum component 220. For example, the expansion strap 230 may comprise titanium. A first set of fasteners 240 may couple the composite component 210, the expansion strap 230, and the aluminum component 220. A second set of fasteners 245 may couple the composite component 210 and the expansion strap 230.

The joint 200 may be subjected to a wide range of temperatures and significant temperature differentials across its various portions and materials. For example, the joint 200 may be a portion of a gas turbine engine, and the joint 200 may experience temperatures in the range of between −50° C. to 300° C. (−60° F. to 570° F.) or greater. The joint 200 may be configured to withstand a bearing load from the fasteners 240 at these extreme high temperature conditions and during extreme temperature differential events. In response to an increase in temperature, the joint 200 may expand. Due to the differing coefficients of thermal expansion, the aluminum component 220 may expand more than the expansion strap 230, and the expansion strap 230 may expand more than the composite component 210. The relative expansion between the composite component 210, the expansion strap 230, and the aluminum component 220 may create a bearing stress on the composite component 210 at the first set of fasteners 240 and the second set of fasteners 245. The distance between the first set of fasteners 240 and the second set of fasteners 245 in the x-direction (x-y-z axes are shown for ease of illustration) may be relatively small in relation to the length L of the aluminum component 220. Thus, the primary increase in length and the primary source of stress may be in the y-direction. The second set of fasteners 245 may receive a portion of the load between the composite component 210 and the expansion strap 230 and may decrease the load on the first set of fasteners 240.

Figure 3A:
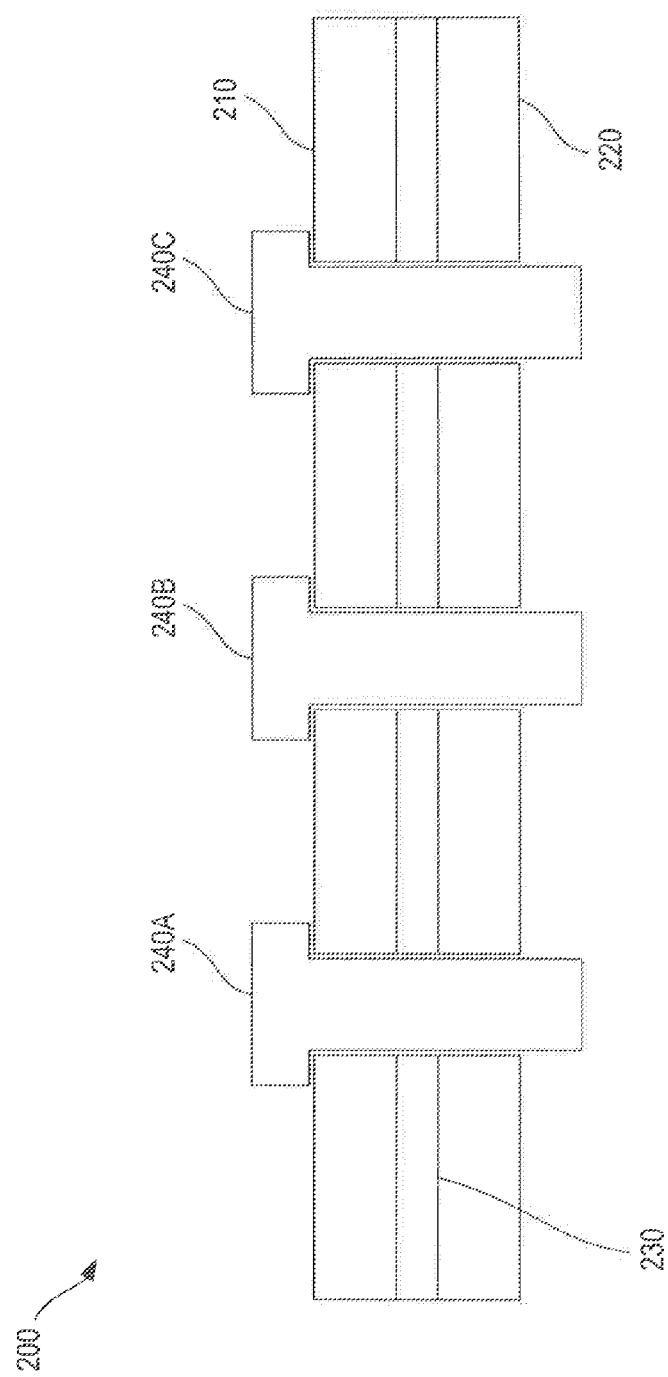
FIG. 3A illustrates a schematic cross-section view of the joint of FIG. 2.
Figure 3B:
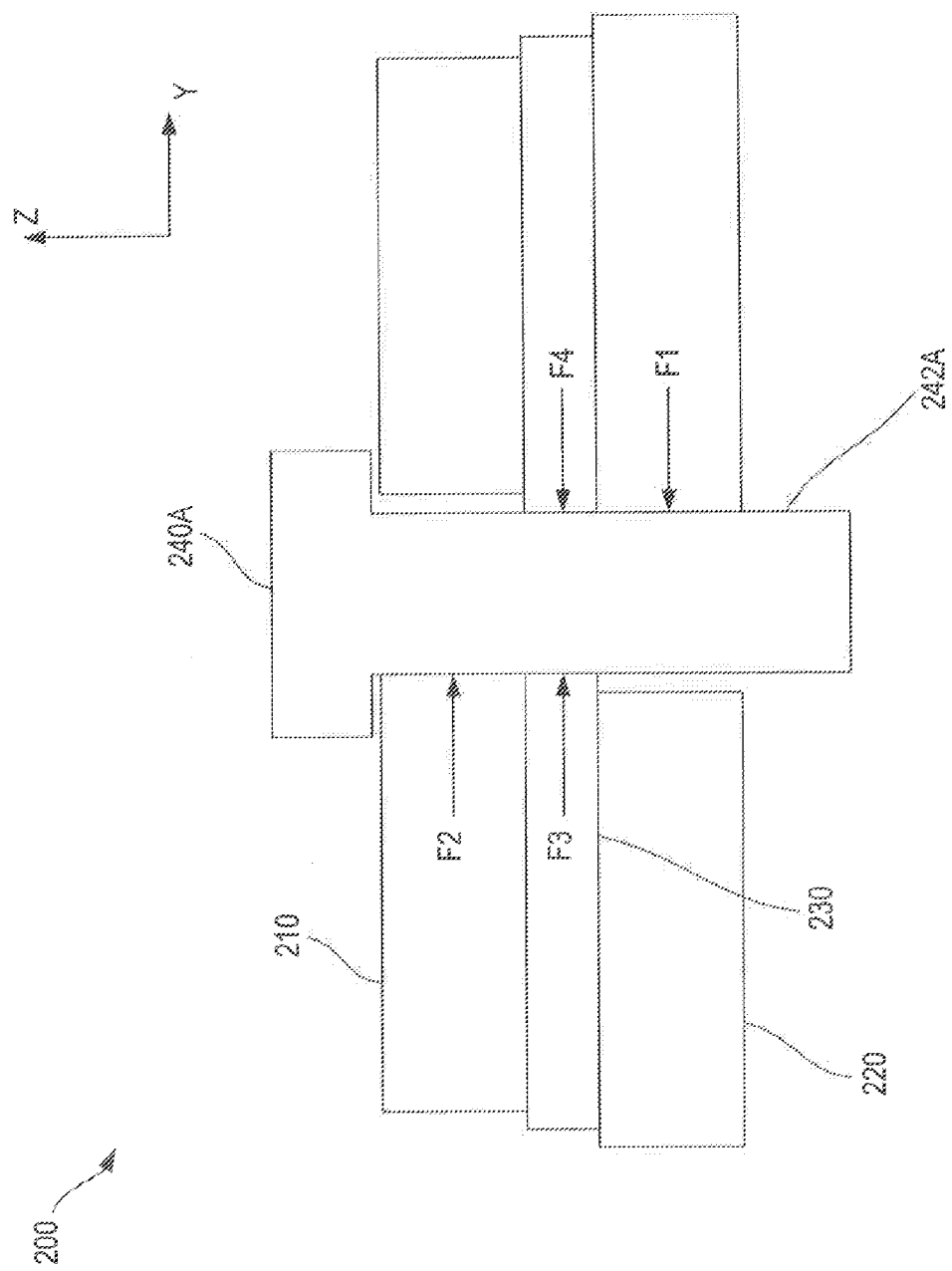
FIG. 3B illustrates a schematic cross-section view of the joint of FIG. 2 undergoing thermal expansion.

Referring to FIGS. 3A, and 3B, a cross-section view taken through the first set of fasteners 240 of joint 200 is illustrated as joint 200 undergoes thermal expansion. In FIG. 3A, joint 200 is illustrated in an unstressed condition. Fasteners 240A, 240B, and 240C couple the composite component 210 to the aluminum component 220, with the expansion strap 230 located between the composite component 210 and the aluminum component 220. An interference or transition fit may exist between each of the fasteners 240A, 240B, and 240C and the composite component 210, the aluminum component 220, and the expansion strap 230.

Referring to FIG. 3B, which now focuses on just the single fastener 240A, the joint 200 has increased in temperature, and the composite component 210, the expansion strap 230, and the aluminum component 220 have each expanded. The aluminum component 220 has expanded the most due to its higher coefficient of thermal expansion. For convenience of explanation only, gaps are illustrated between the fastener 240A and the various materials in order to help visualize the resulting differential thermal expansion, however in actuality these gaps may not exist. A bearing force is applied by the composite component 210 against the Fastener 240A at F2. Another bearing force is applied by the aluminum component 220 against the fastener 240A at F1 in the opposite direction of F2. Also, bearing forces may be applied by the expansion strap 230 against the fastener at F3 and F4. These bearing forces create shear stresses in fastener 240A which must be sufficiently accounted for in its design. Also, the bearing loads result in bearing stresses in the composite, aluminum and titanium materials around their interfaces that engage fastener 240A, and these bearing stresses must be sufficiently accounted for in their designs.

In the configuration illustrated in FIG. 3B the bearing stress on the composite component 210 will be less than the bearing stress would be without the presence of the expansion strap 230. The bearing stress will be proportional to the local shear stress in the fastener 240A. Around the composite component 210 interface with fastener 240A, the shear stress of fastener 240A is reduced compared to what it would be without the expansion strap 230. The local shear stress is a function of the difference between threes F2 and F4 which act in opposite directions. As a comparison, without the presence of the expansion strap the shear stress would be a function of the difference between forces F2 and F1, which is a greater differential than the difference between F2 and F4. Thus, the expansion strap helps reduce bearing loads by reinforcing the fastener 240A at the joint and reducing the local shear stress in the fastener. With the reduction in joint bearing loads, the need to reinforce the composite component 210 by adding extra plies of composite is reduced, which may reduce the resultant weight and cost penalties.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

I claim:

1. A joint comprising:
a composite bond panel having a first coefficient of thermal expansion;
a titanium expansion strap in contact with the composite bond panel, the titanium expansion strap having a second coefficient of thermal expansion, wherein the second coefficient of thermal expansion is greater than the first coefficient of thermal expansion;
an aluminum hinge beam in contact with the titanium expansion strap, the aluminum hinge beam having a third coefficient of thermal expansion, wherein the third coefficient of thermal expansion is greater than the second coefficient of thermal expansion; and
a first plurality of fasteners coupling the composite bond panel, the titanium expansion strap, and the aluminum hinge beam together, wherein the titanium expansion strap is located between the composite bond panel and the aluminum hinge beam, and wherein the first plurality of fasteners pass through the composite bond panel, the titanium expansion strap, and the aluminum hinge beam.

2. The joint of claim 1, further comprising a second plurality of fasteners, wherein the second plurality of fasteners couple the composite bond panel to the titanium expansion strap, and wherein the second plurality of fasteners pass through the composite bond panel and the titanium expansion strap.

3. The joint of claim 1, wherein the composite bond panel comprises a nacelle component for an aircraft.

4. The joint of claim 1, wherein the first plurality of fasteners comprise at least one of a bolt or a rivet.

5. The joint of claim 1, wherein the titanium expansion strap is configured to decrease a bearing load on the composite bond panel.

6. An aircraft nacelle comprising:
an aluminum hinge beam;
a composite bond panel;
a titanium expansion strap located between the aluminum hinge beam and the composite bond panel, wherein the titanium expansion strap is in contact with the aluminum hinge beam and the composite bond panel; and
a first plurality of fasteners coupling the composite bond panel, the titanium expansion strap, and the aluminum hinge beam together, wherein the titanium expansion strap is located between the composite bond panel and the aluminum hinge beam, and wherein the first plurality of fasteners pass through the composite bond panel, the titanium expansion strap, and the aluminum hinge beam.

7. The aircraft nacelle of claim 6, wherein a coefficient of thermal expansion of the titanium expansion strap is greater than a coefficient of thermal expansion of the composite bond panel and less than a coefficient of thermal expansion of the aluminum hinge beam.

8. The aircraft nacelle of claim 6, further comprising a second plurality of fasteners coupling the composite bond panel to the titanium expansion strap.

9. The aircraft nacelle of claim 6, wherein the titanium expansion strap is configured to reduce a bearing load on the composite bond panel.

10. The aircraft nacelle of claim 6, wherein the composite bond panel is configured to withstand a bearing load from the aluminum hinge beam at a temperature of at least 300° C.

* * * * *